United States Patent [19]
Kanazawa et al.

[11] Patent Number: 5,637,986
[45] Date of Patent: Jun. 10, 1997

[54] POWER CONTROL DEVICE OF ALTERNATOR FOR VEHICLE

[75] Inventors: Wakako Kanazawa, Toyokawa; Fuyuki Maehara, Kariya; Toshinori Maruyama, Anjo, all of Japan

[73] Assignee: Nippondenso Co., Ltd., Kariya, Japan

[21] Appl. No.: 495,631

[22] PCT Filed: Dec. 19, 1994

[86] PCT No.: PCT/JP94/02129

§ 371 Date: Aug. 4, 1995

§ 102(e) Date: Aug. 4, 1995

[87] PCT Pub. No.: WO95/17778

PCT Pub. Date: Jun. 29, 1995

[30] Foreign Application Priority Data

Dec. 21, 1993 [JP] Japan .................. 5-322352

[51] Int. Cl.⁶ .................................. H02P 9/00
[52] U.S. Cl. ............................ 322/28; 322/20
[58] Field of Search ................... 322/20, 25, 28

[56] References Cited

U.S. PATENT DOCUMENTS

| | | |
|---|---|---|
| 4,613,808 | 9/1986 | Edwards .................. 322/99 |
| 4,636,706 | 1/1987 | Bowman et al. . |
| 5,140,253 | 8/1992 | Itoh . |
| 5,173,654 | 12/1992 | Boella et al. .............. 322/25 |
| 5,262,711 | 11/1993 | Mori et al. . |
| 5,319,299 | 6/1994 | Maehara . |
| 5,448,154 | 9/1995 | Kanke et al. ............. 322/28 |

FOREIGN PATENT DOCUMENTS 0421332 4/1991 European Pat. Off. .
538200 2/1993 Japan .

*Primary Examiner*—Thomas M. Dougherty
*Assistant Examiner*—Nicholas Ponomarenko
*Attorney, Agent, or Firm*—Cushman, Darby & Cushman Ip Group of Pillsbury Madison and Sutro LLP

[57] ABSTRACT

The present invention relates to a device which supplies a field current to the field coil of an alternator for a vehicle in a gradually changing manner. In the device, a pulse voltage which has a pulse width corresponding to a phase difference between output signals of first and a second counters (15 and 16) is generated by a maximum duty ratio limiting circuit (19). When the alternator output voltage becomes higher than a reference voltage, the full-scale count time of the second counter is shortened relative to the full-scale count time of the first counter. On the other hand, when the output voltage becomes lower than the reference voltage, the same is elongated to thereby increase the phase difference. A switching transistor (12) is provided to control the field current supplied to the alternator field coil in response to the above pulse voltage.

16 Claims, 4 Drawing Sheets

POWER CONTROL DEVICE OF ALTERNATOR FOR VEHICLE

TECHNICAL FIELD

The present invention relates to a power control device of an alternator for a vehicle which controls the field current and prevents abrupt increase in the torque of the alternator when an electric load is connected to the alternator.

BACKGROUND ART

Such a device is disclosed in Japanese patent unexamined publication Sho 62-64299 and its U.S. Pat. No. 4,636,706 to Bowman as one of the conventional power control devices of alternators.

However, the device disclosed in the above publication is equipped with an up-down counter (a binary counter which can count up and down) which is controlled according to a result of comparison of an output voltage of an alternator with a reference voltage and a PWM circuit (pulse width modulation circuit) which includes a down-counter and generates pulse signals having pulse width changing according to the number counted by the up-down counter to supply a field current to the alternator field coil. Therefore, many digital circuit elements are required and, consequently, the digital circuit becomes complicated.

Another object of the present invention is to provide a simple digital circuit which changes the field current gradually.

Another object of the present invention is to provide means for controlling the field-current switching means to have different conducting times between increasing the field current and decreasing the field current without difficulty.

A further object of the present invention is to provide means for controlling the field current switching means to synchronize an output timing of comparison between the alternator output voltage and a reference voltage with the switching timing of the field-current switching means so that the switching means can switch on or off steadily even under an abrupt output voltage change.

DISCLOSURE OF THE INVENTION

The power control device of an alternator for a vehicle according to the present invention comprises an alternator driven by an engine for supplying electric current to vehicle electric loads, a comparator for comparing an alternator output voltage with a reference voltage, an oscillator-couple having first and second oscillators for generating oscillating signals having a phase difference therebetween which varies according to the output signal of the comparator, switching means for controlling the field current in response to the phase difference supplied to the alternator field coil when an electric signal is applied thereto, and a phase difference control circuit for shortening the oscillation cycle of the second oscillator relative to the oscillation cycle of the first oscillator to decrease the phase difference between the signals of the first and the second oscillators when the alternator output voltage, becomes higher than a reference voltage and for elongating the oscillation cycle of the second oscillator relative to the oscillation cycle of the first oscillator thereby to increase the the phase difference between the signals of the first and second oscillators when the alternator output voltage becomes lower than the reference voltage, thereby increasing the phase difference.

According to the above structure, when the alternator output voltage becomes higher than the reference voltage, the phase difference between the oscillating signals of the two oscillators is controlled shorter. On the other hand, when the alternator output voltage becomes lower than the reference voltage, the switching means is made conductive by an electric signal having a pulse width corresponding to the phase difference. Thus, the abrupt increase of the generation torque can be prevented. Thereafter, the phase difference between the two oscillation signals gradually increases and the conduction rate of the switching means increases.

According to the present invention as described above, the pulse width of the electric signal can be controlled by the phase difference between the two oscillation signals, and the up-down counter is not necessary and the circuit can be made simpler.

The device according to the present invention is characterized in that the electric signal is applied to the switching means in synchronism with the signal of the first oscillator, or the second oscillator and at least either the shortening or elongating of the oscillating cycle is changed once in a plurality of times the electric signal is applied to the switching means, thereby to achieving gradual supply of the field current.

The device according to the present invention is characterized in that the switching means is opened when the alternator output voltage becomes higher than the reference voltage to interrupt the field current without delay.

The device according to the present invention generates a first pulse signal according to the output signal of the comparator, and obtains logical multiplication (AND) of the first pulse signal and the second pulse signal having pulse width responsive to the phase difference to control the switching means according to the AND signal, thereby interrupting the field current without delay.

The device according to the present invention comprises an alternator driven by an engine for supplying electric current to vehicle electric loads, a comparator for comparing an alternator output voltage with a reference voltage, first and second counters for counting by a clock, a maximum duty-ratio limiting circuit generating a pulse signal having a pulse width corresponding to the difference between timings of outputting the numbers counted by the respective counters, a switching means for switching on and off the field current in response to the pulse signal of the maximum duty-ratio limiting circuit, and a phase difference changing circuit for shortening the full-scale count time of the second counter relative to the full-scale count time of the first counter thereby to decrease the phase difference when the alternator output voltage becomes higher than the reference voltage and for elongating the full-scale count time of the second counter relative to the count time of the first counter thereby to increase the phase difference when the alternator output voltage becomes lower than the reference voltage, thereby increasing the phase difference.

According to the above structure, the pulse width of the electric signal can be controlled according to the phase difference of the two counters so that the up-down counter can be omitted and the circuit becomes simple.

Further, the device according to the present invention is characterized in that the full-scale count time of the first counter is shortened by a timing signal which is obtained after a signal synchronized with the output pulse signal of the maximum duty-ratio limiting circuit is divided several times to increase the phase difference, thereby enabling the gradual increase of the field current.

Furthermore, the device according to the present invention is characterized in that the full-scale count time of the second counter is shortened by a timing signal synchronized with the counting of the second counter so that the phase difference is decreased more frequently than it is increased, thereby differentiating the speed of changes in the pulse width between increasing and decreasing thereof with ease.

In addition, the device according to the present invention comprises a reset determination circuit for resetting the first counter in synchronism with the timing signal to shorten the full-scale count time of the first counter and to increase the phase difference, thereby enabling the gradual increase of the field current.

Still further, the device according to the present invention comprises a reset determination circuit for resetting the second counter in synchronism with the timing signal to shorten the full-scale count time of the first counter and to decrease the phase difference, thereby decreasing the maximum duty ratio.

Still further, the device according to the present invention is characterized in that the clock signal applied to the second counter is controlled according to logical multiplication of the timing signal, which is obtained after the output signal of the first counter is divided several times and the output signal of the first counter, thereby increasing the full-scale count time of the second counter relative to the full-scale count time of the first counter so as to increase the phase difference, enabling a gradual increase of the field current.

Still further, in the device according to the present invention, the maximum duty-ratio limiting circuit comprises a flip-flop circuit which is set at a given number of the first counter and reset at a given number of the second counter, thereby providing a simple circuit.

Still further, the device according to the present invention comprises a constant frequency circuit for generating a second pulse signal having a pulse width which varies according to the output of the comparator in synchronism with the output pulse signal of the maximum duty-ratio limiting circuit, and a reset determination circuit for determining decreases of the phase difference in response to the conditions of the first and second pulse signals when the second counter counts a given number, whereby steady switching operation is ensured even when an abrupt change of the output voltage takes place.

Furthermore, the device according to the present invention comprises a constant frequency circuit for setting a reference level in synchronism with the output pulse signal of the maximum duty-ratio limiting circuit and for generating an output which is a result of comparison of the reference level and a smoothed or an average level of the output of the comparator, whereby the switching means is controlled according to the output signal of the constant frequency circuit, thereby ensuring reliable control of the switching means.

Still further, the device according to the present invention comprises an AND circuit for producing logical multiplication of the output signal of the maximum duty ratio limiting circuit and the output signal of the comparator and for controlling the switching means, whereby fast switching operation of the field current is ensured.

Still further, in the device according to the present invention, the switching means is opened when said alternator output voltage becomes higher than said reference voltage, whereby fast switching operation of the field current is ensured.

Still further, the device according to the present invention comprises an alternator driven by an engine for supplying electric current to vehicle electric loads, a comparator for comparing an alternator output voltage with a reference voltage, first and second counters for counting by a clock, a maximum duty-ratio limiting circuit generating a pulse signal having a pulse width corresponding to a time difference between output signals of the respective counters, a switching means for switching on or off the field current in response to the pulse signal of the maximum duty-ratio limiting circuit, and a time difference determination circuit for determining the time difference between the output signals of the first and second counters according to comparison of the alternator output voltage and the reference voltage.

As a result, the pulse width of the electric signal can be determined in accordance with the phase difference between the two signals of the counters, thereby omitting the up-down counter and making the circuit simple.

BEST MODE OF CARRYING OUT THE INVENTION

The invention is described in more detail with reference to Figures, next.

Figure 1:
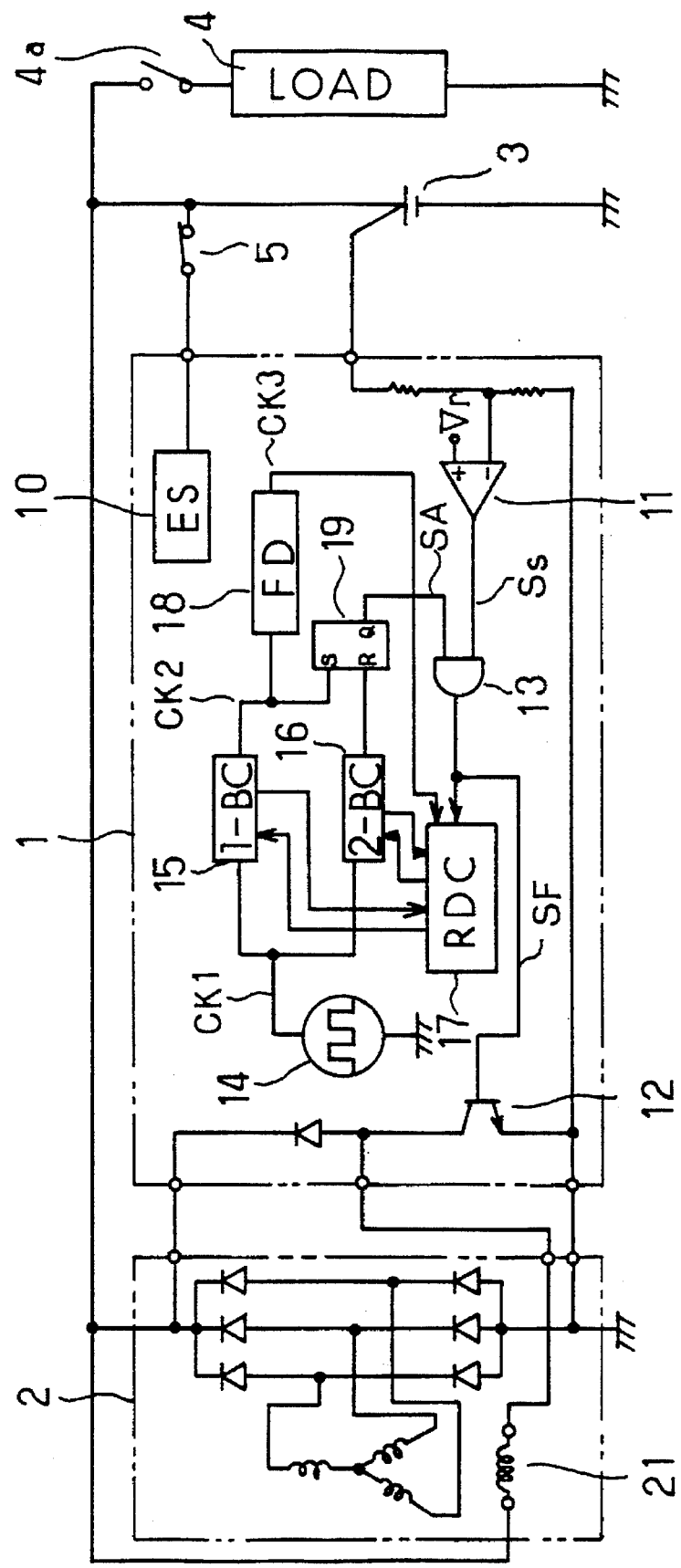
FIG. 1 is a circuit diagram of a device according to an embodiment of the present invention.

An embodiment is described with reference to FIG. 1 and FIG. 2. A reference numeral 1 is a voltage regulator (regulator), which detects a charging voltage of a battery 3 charged by an alternator 2. In the regulator 1, a comparator 11 disconnects a transistor (Tr) 12 which composes a switching means controlling a field current supplied to a field coil 21 of the alternator 2 when a detected charging voltage is greater than a reference voltage Vr. An power supply 10 of the regulator 1 is connected to the battery 3 through a key switch 5.

A reference numeral 15 is a first binary counter. The counter is n-stage counter, which starts to count from $2^0$ up to $2^n$ and returns $2^0$, and generates a clock signal (CK2) having a cycle $TK2=TK1 \times 2^n$ in synchronism with a clock signal CK1 generated by an oscillator 14 (having a cycle TK1).

A reference numeral 16 is a n-stage second binary counter which counts in synchronism with the clock signal CK1 in the same manner as the first binary counter 15.

A reference numeral 19 is a hold circuit. The circuit composes a maximum duty ratio limiting circuit which generates a pulse signal according to a phase difference between the first and second counters. The hold circuit 19 includes a SR flip-flop circuit which is set to generate Hi signal when the first counter 15 counts a first given number and is reset to generate Lo signal when the second counter 16 counts a second given number. In case the SR flip-flop circuit 19 is set when the first counter 15 counts $2^n$ and, thereafter, it is reset when the second counter 16 counts $2^0$, the set time is $(k+1) \times TK1$ at the cycle TK2, wherein k is a count number corresponding to a phase difference between the first and the second counters. Then, the transistor 12 is made conductive by the output of the AND circuit 13 which is applied at its input terminals an output of a terminal Q of the hold circuit 19 and an output of the voltage detecting comparator 11. Thus, the maximum duty-ratio is limited to $(k+1) \times TK1/TK2=(k+1)/2^n$.

A reference numeral 17 is a reset determination circuit which shortens the full-scale count time of the first counter 15 when a detected charging voltage of the battery 3 is lower than the reference voltage Vr so that the phase difference between the first and the second counters 15 and 16 is increased.

Figure 3:
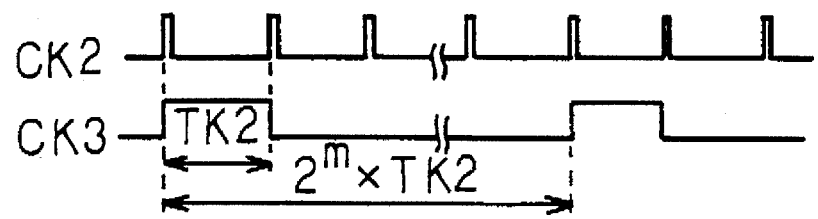
FIG. 3 is a time chart showing the operation of the above embodiment.

A reference numeral 18 is a frequency dividing circuit which controls the reset determination circuit 17 to limit the timing of increasing the phase difference between the first and the second counters 15 and 16. The frequency dividing circuit 18 includes an m-stage binary counter and reduces the frequency of increasing the phase difference to $1/2^m$ (as shown in FIG. 3).

The operation of the above embodiment is described next.

When the charging voltage of the battery 3 is lower than the reference voltage Vr, the output signal Ss of the comparator 11 becomes Hi. Accordingly, the conduction of the transistor 12 is controlled by the output signal of the Q terminal of the hold circuit 19. The hold circuit 19 is set when the count number of the first counter 15 becomes $2^n$ (CK2) and the output signal of the terminal Q becomes Hi. Thereafter, it is reset by the $2°$ signal of the second counter 16 and the output signal of the Q terminal becomes Lo. When the count phase of the first counter 15 leads by a number k ahead of the second counter, the output signal of the Q terminal of the hold circuit 19 holds the Hi signal until it counts as many as (k+1).

Figure 4:
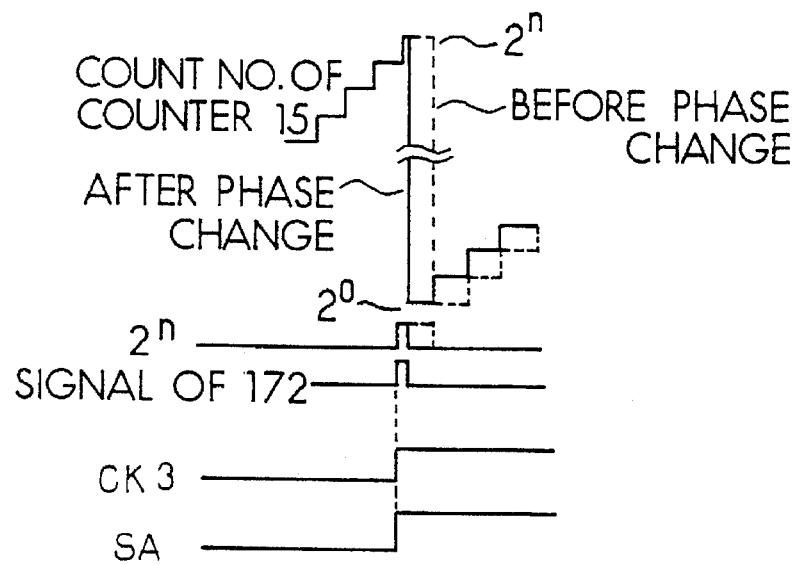
FIG. 4 is a time chart showing the operation of the above embodiment.

When the count number of the first counter 15 becomes $2^n$, the output signal of the hold circuit 19 becomes Hi and, consequently, the output signal of the AND circuit 13 becomes Hi. At this moment, an AND circuit 172 ( shown in FIG. 2) generates an output signal Hi while the signal CK3 is Hi, thereby to reset the counter 15 to the number $2°$ (as shown in FIG. 4). That is, the counting of the first counter 15 leads one time ahead and the phase of the number counted by the counter 15 leads so that the phase difference between the first counter 15 and the second counter 16 increases.

Accordingly, the output signal (maximum duty ratio signal SA) of the hold circuit 19 becomes Hi for a period corresponding to (k+2) and the duty ratio of the transistor 12 increases to $(k+2)/2^n$ from $(k+1)/2^n$. As the duty ratio of the transistor 12 increases at a rate $1/2^n$ each cycle CK3, the field current increases gradually and the generating torque and the output current of the alternator 2 increase gradually.

When the charging voltage of the battery 3 is higher than the reference voltage Vr, the output signal Ss of the comparator 11 becomes Lo, the AND circuit 13 outputs the Lo signal and the transistor 12 is turned off, thereby to decrease the output current of the alternator. At this stage, when the second counter has counted $2^n$, a Hi signal is applied to the non-inverting input terminal of the AND circuit 171 while a Lo signal is applied from the AND circuit 13 to the inverting terminal thereof, thereby resetting the second counter 16 to $2°$. Therefore, the counting of the second counter 16 is brought forward by one time and the phase of the counter 16 advances, thereby decreasing the phase difference between the counting of the first and the second counters. As a result, the duty ratio of the output signal (maximum duty ratio signal SA) of the hold circuit 19 is decreased.

If the phase difference is further controlled to decrease while the phase difference between the counting of the first and the second counters has been at a minimum, the duty ratio may change from a minimum to a maximum. On the other hand, if the phase difference is further controlled to increase while the phase difference between the counting of the first and the second counters has been at a maximum, the duty ratio may change from the maximum to the minimum. In order to prevent the above inconvenience, means for limiting the range of phase difference may be provided.

Figure 5:
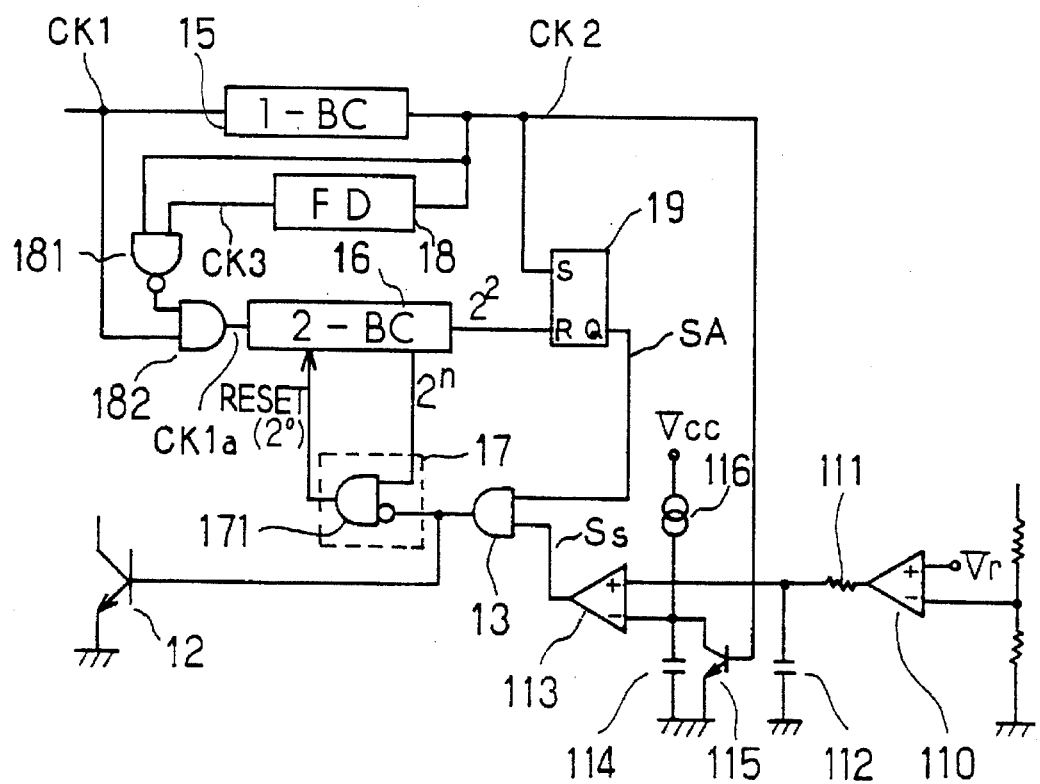
FIG. 5 is a circuit diagram according to a second embodiment of the present invention.
Figure 6:
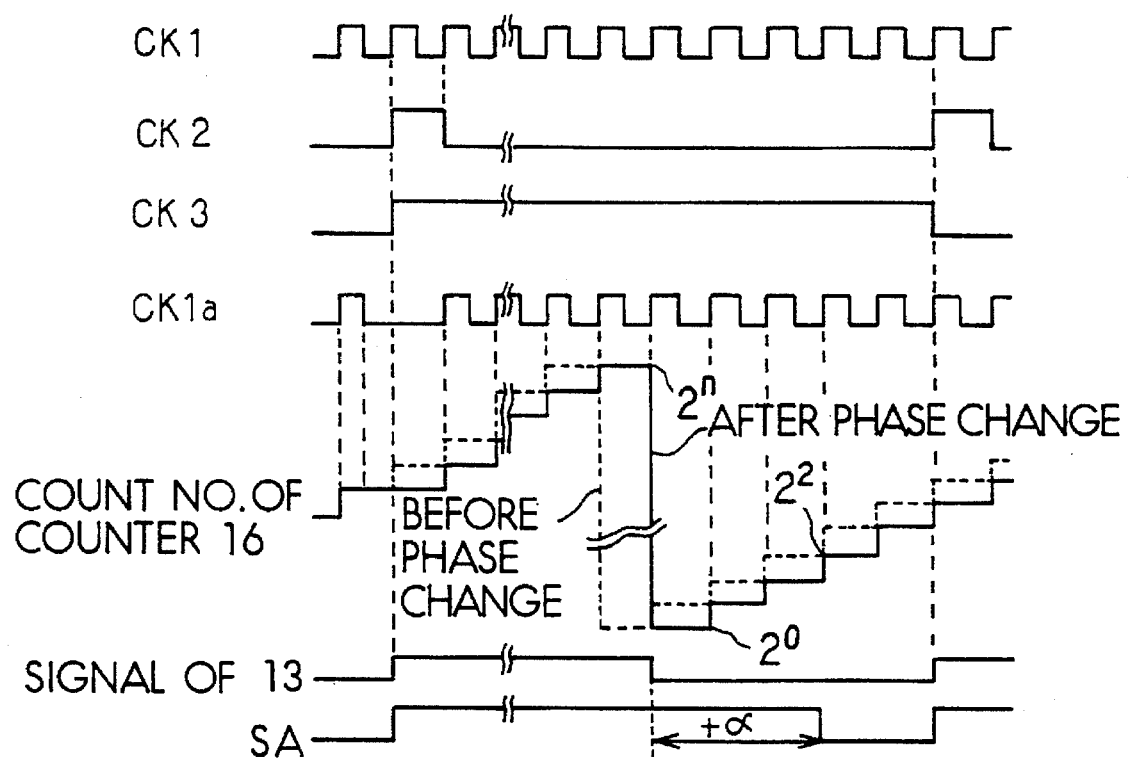
FIG. 6 is a time chart showing operation of the above embodiment.

Another embodiment is described with reference to FIG. 5 and FIG. 6. In order to increase the phase difference, the counting of the second counter 16 is stopped once in this embodiment although the counting of the first counter 15 is advanced in the above embodiment.

The phase difference may be increased without regard to the detected voltage of the battery 3, however the increasing speed thereof is low since the counter increments by 1 at a cycle CK3. On the other hand, since the phase difference is decreased by one count in a cycle of CK2, the decreasing speed is $(2^m-1)$ times as fast as the increasing speed. Therefore, if the frequency divider circuit 18 is one stage type, the increasing speed is the same as the decreasing speed, and if the frequency divider circuit 18 has more than two stages, the increasing speed becomes lower than the decreasing speed.

The embodiment has an averaging circuit (a resistor 111 and a capacitor 112) which averages the difference between the detected voltage of the battery 3 and the reference voltage Vr and generates an average voltage. The average voltage is compared with a saw tooth voltage wave which is synchronized with the signal CK2 and formed into a constant frequency signal Ss which is synchronized with the signal CK2. The signal Ss becomes Hi in synchronism with the rise-up of the signal CK2 when a transistor 115 is made conductive. If the signal Ss becomes Lo before the second counter 16 becomes $2°$, the counting by the second counter 16 is carried one time ahead, thereby advancing the phase. Since the phase of the counter 16 loses one count in each cycle of the signal CK3, the phase of the counter 16 is controlled so that the duration in which the signal Ss stays Hi becomes a period in which the output signal CK2 of the counter 15 rises up and the count number of the second counter 16 becomes $20°$. The output signal of the terminal Q of the hold circuit 19 (maximum duty ratio signal SA) is set when the signal CK2 rises up and reset when the second counter 16 counts $2^2$ so that the duty ratio (DA) of the output signal (maximum duty ratio signal SA) of the Q terminal of the hold circuit become greater than the duty ratio (Ds) of the signal Ss ( that is, $DA=Ds+2^2/2^n$). As a result, when the alternator runs under a normal operation, no limitation by the maximum duty ratio signal is applied. Even if the electric load connected to the alternator changes in some degree, the conducting period of the transistor 12 can change within a ratio $2^2/2^n$ immediately (since it is not limited by the maximum duty ratio signal) and no trouble of the voltage drop (e.g. dimming of the head lights) due to shortage of the output current of the alternator is expected.

In case the electric load increases significantly, the maximum duty ratio signal SA limits the increase of the duty ratio of the transistor 12.

Figure 2:
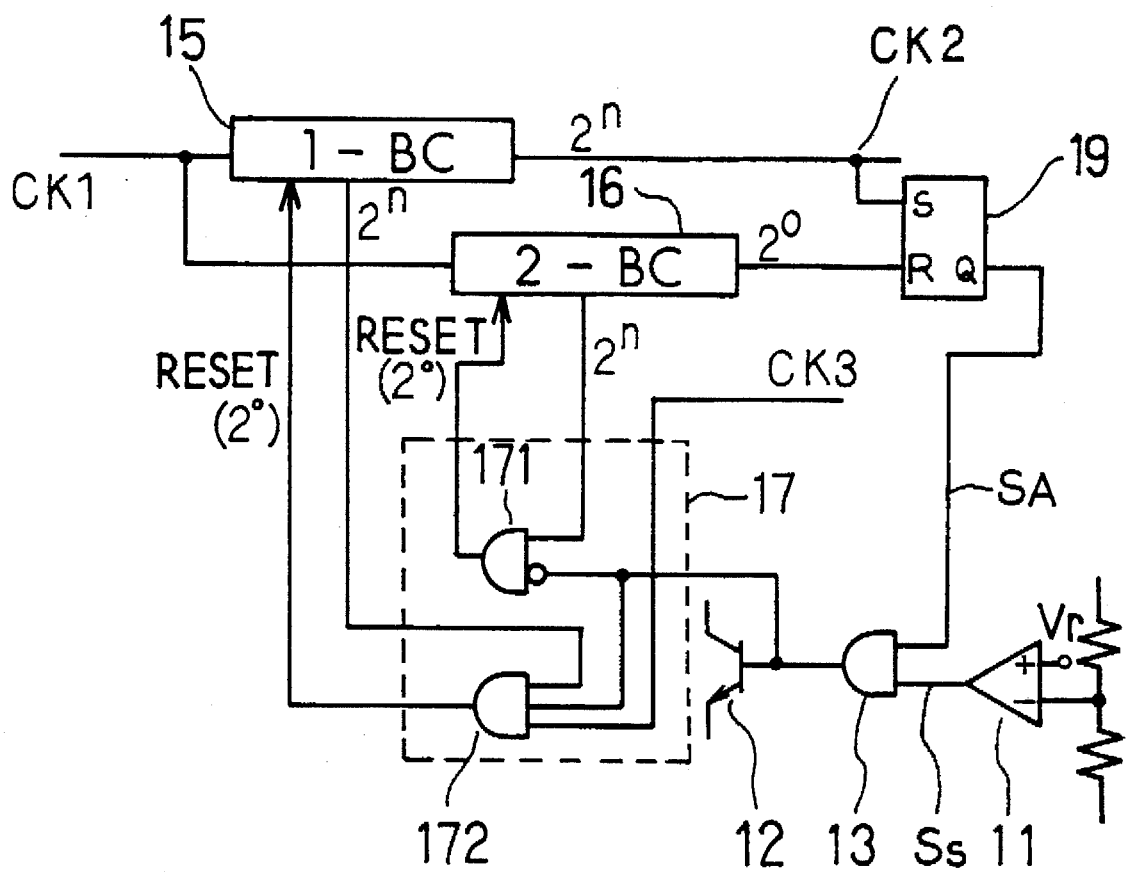
FIG. 2 is a circuit diagram of a main part of the above embodiment.

The transistor 12 may be controlled by the maximum duty ratio limiting circuit (hold circuit 19) shown in FIG. 2.

INDUSTRIAL APPLICABILITY

As described above, the power control device of the alternator for a vehicle according to the present invention is most appropriate to a device for controlling the field current supplied to the field coil of the vehicle alternator by a digital circuit.

We claim:

1. A power control device of an alternator for a vehicle comprising:

an alternator driven by an engine for supplying electric current to vehicle electric loads, a comparator for comparing an alternator output voltage with a reference voltage, an oscillator-couple having first and second oscillators for generating oscillating signals having a phase difference therebetween which varies according to an output signal of said comparator;

switching means for controlling a field current according to a signal having a pulse width which varies in response to said phase difference, and a phase difference control circuit for decreasing an oscillation cycle of said second oscillator relative to an oscillation cycle of said first oscillator when said alternator output voltage becomes higher than said reference voltage thereby to decrease a phase difference between said oscillating signals, and increasing said oscillation cycle of said first oscillator when said alternator output voltage becomes lower than said reference voltage thereby to increase said phase difference.

2. A power control device of an alternator for a vehicle claimed in claim 1, wherein said phase difference control circuit supplies an electric signal to said switching means in synchronism with said signal of said first oscillator or said second oscillator and changes at least either one of said decreasing and increasing of the oscillating cycle once in a plurality of times said electric signal is applied to said switching means.

3. A power control device of an alternator for a vehicle as claimed in claim 1 or claim 2, wherein said phase difference control circuit opens said switching means when said alternator output voltage becomes higher than said reference voltage to interrupt said field current.

4. A power control device of an alternator for a vehicle as claimed in claim 1 or claim 2, wherein said phase difference control circuit generates a first pulse signal according to said output signal of said comparator, and obtains an AND output signal of said first pulse signal and said second pulse signal having a pulse width responsive to the phase difference to control the switching means according to said AND output signal, thereby controlling said switching means.

5. A power control device of an alternator for a vehicle comprising:

an alternator driven by an engine for supplying electric current to vehicle electric loads, a comparator for comparing an alternator output voltage with a reference voltage, first and second counters for counting by a clock, a maximum duty-ratio limiting circuit generating a pulse signal having a pulse width corresponding to a phase difference between output signals of said respective counters, a switching means for switching on or off the field current in response to said pulse signal of said maximum duty-ratio limiting circuit, and a phase difference changing circuit for shortening a full-scale count time of said second counter relative to a full-scale count time of said first counter when the alternator output voltage becomes higher than said reference voltage thereby to decrease said phase difference, and for elongating said full-scale count time of said second counter relative to said full-scale count time of said first counter when said alternator output voltage becomes lower than said reference voltage thereby to increase said phase difference.

6. A power control device of an alternator for a vehicle claimed in claim 5, wherein said phase difference changing circuit shortens said full-scale count time of said first counter in response to a timing signal which is obtained after a signal synchronized with an output pulse signal of said maximum duty-ratio limiting circuit is divided several times to increase said phase difference.

7. A power control device of an alternator for a vehicle claimed in claim 6, wherein said phase difference changing circuit shortens said full-scale count time in response to a timing signal synchronized with a number counted by said second counter so that said phase difference is decreased more frequently than it is increased.

8. A power control device of an alternator for a vehicle claimed in claim 6, wherein said phase difference changing circuit comprises a reset determination circuit for resetting said first counter in synchronism with said timing signal to shorten said full-scale count time of said first counter and to increase said phase difference.

9. A power control device of an alternator for a vehicle claimed in claim 7, wherein said phase difference changing circuit comprises a reset determination circuit for resetting the second counter in synchronism with said timing signal to shorten said full-scale count time of said second counter and to decrease said phase difference.

10. A power control device of an alternator for a vehicle claimed in claim 5, wherein said phase difference changing circuit comprises means for dividing said output signal of said first counter several times to produce a timing signal and provides a logical multiplication of said timing signal and output signal of the first counter to obtain a clock signal applied to the second counter, thereby increasing the full-scale count time of the second counter relative to the full-scale count time of the first counter and to increase the phase difference.

11. A power control device of an alternator for a vehicle claimed in claim 5, wherein said maximum duty ratio limiting circuit comprises a flip-flop circuit which is set at a given number counted by the first counter and reset at a given number counted by the second counter.

12. A power control device of an alternator for a vehicle claimed in claim 5 further comprising a constant frequency circuit for generating a second pulse signal having a pulse width which varies in response to the output of the comparator in synchronism with the output pulse signal of the maximum duty-ratio limiting circuit and a reset determination circuit for determining the decrease of said phase difference according to conditions of the first and second pulse signal when the second counter counts a given number.

13. A power control device of an alternator for a vehicle claimed in claim 5 further comprising a constant frequency circuit for setting a reference level in synchronism with said pulse signal of said maximum duty ratio limiting circuit and comparing said output signal of said comparator with said reference voltage to generates a compared signal so as to control said switching means.

14. A power control device of an alternator for a vehicle claimed in claim 5 further comprising an AND circuit for producing logical multiplication of said output signal of said maximum duty ratio limiting circuit and said output signal of said comparator and for controlling said switching means.

15. A power control device of an alternator for a vehicle claimed in claim 5, wherein said phase difference changing circuit opens said switching means when said alternator output voltage becomes higher than said reference voltage.

16. A power control device of an alternator for a vehicle comprising:

an alternator driven by an engine for supplying electric current to vehicle electric loads, a comparator for comparing an alternator output voltage with a reference voltage, first and second counters for counting by a clock, a maximum duty-ratio limiting circuit generating a pulse signal having a pulse width corresponding to a time difference between output signals of said respective counters, a switching means for switching on or off the field current in response to said pulse signal of said maximum duty-ratio limiting circuit, and a time difference determination circuit for determining said time difference between said output signals of said first and second counters according to comparison of said alternator output voltage and said reference voltage.

* * * * *